(12) United States Patent
Hall et al.

(10) Patent No.: US 12,448,224 B2
(45) Date of Patent: Oct. 21, 2025

(54) CONVEYOR TRANSFER SYSTEM

(71) Applicant: Laitram, L.L.C., Harahan, LA (US)

(72) Inventors: Benson Hall, Harahan, LA (US); Mitchell G. Pansano, Jr., Harahan, LA (US); Geoffrey Nicholas Bennett, Annapolis, MD (US); Wayne A. Pertuit, Jr., Westwego, LA (US); Bryant G. Ragan, Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 242 days.

(21) Appl. No.: 18/036,119

(22) PCT Filed: Nov. 19, 2021

(86) PCT No.: PCT/US2021/060135
§ 371 (c)(1),
(2) Date: May 9, 2023

(87) PCT Pub. No.: WO2022/125292
PCT Pub. Date: Jun. 16, 2022

(65) Prior Publication Data
US 2024/0017938 A1    Jan. 18, 2024

Related U.S. Application Data

(60) Provisional application No. 63/124,445, filed on Dec. 11, 2020.

(51) Int. Cl.
*B65G 54/02* (2006.01)
*B65G 47/61* (2006.01)

(52) U.S. Cl.
CPC ............ *B65G 47/61* (2013.01); *B65G 54/02* (2013.01); *B65G 2201/0258* (2013.01)

(58) Field of Classification Search
CPC ........................... B65G 54/002; B65G 47/844
USPC ............................. 198/370.02, 370.013, 619
See application file for complete search history.

(56) References Cited

U.S. PATENT DOCUMENTS

| 4,191,003 A | 3/1980 | Talarico |
| 4,934,279 A * | 6/1990 | Azukizawa ............. E01B 25/30 104/130.02 |
| 5,409,095 A * | 4/1995 | Hoshi .................. B65G 47/844 198/370.13 |
| 6,540,064 B1 | 4/2003 | Bodewes et al. |

(Continued)

FOREIGN PATENT DOCUMENTS

| EP | 3040297 A1 | 7/2016 |
| EP | 3458389 B1 | 3/2019 |

(Continued)

OTHER PUBLICATIONS

US 2002/0185358 A1, Zeitler et al., Dec. 12, 2002.*

(Continued)

*Primary Examiner* — Douglas A Hess
(74) *Attorney, Agent, or Firm* — James T. Cronvich

(57) ABSTRACT

A transfer system comprising a carrier attached by fastening structure to a linear-motor shuttle driven by a linear-motor stator along a track. Tray packs or other conveyed objects are transferred between the carriers and infeed and outfeed conveyors by the carriers at transfer segments as the carriers advance along the track.

24 Claims, 20 Drawing Sheets

(56) References Cited

U.S. PATENT DOCUMENTS

| | | | |
|---|---|---|---|
| 7,086,519 B2* | 8/2006 | Veit | B65G 47/844 198/370.13 |
| 8,096,409 B2* | 1/2012 | Wipf | B65G 19/02 198/805 |
| 8,776,985 B2* | 7/2014 | Huettner | B65G 54/02 198/459.8 |
| 9,682,829 B2 | 6/2017 | Keil et al. | |
| 10,118,775 B2 | 11/2018 | Walter et al. | |
| 10,252,827 B2 | 4/2019 | Jacobs et al. | |
| 10,308,437 B2 | 6/2019 | Clossner et al. | |
| 10,407,246 B2 | 9/2019 | Reinthaler | |
| 10,486,917 B1 | 11/2019 | Vulpetti | |
| 10,532,891 B2 | 1/2020 | Walter et al. | |
| 10,577,136 B2 | 3/2020 | Burk et al. | |
| 10,608,518 B2 | 3/2020 | Bracker et al. | |
| 10,618,750 B2 | 4/2020 | Bracker et al. | |
| 10,622,921 B2 | 4/2020 | Weber et al. | |
| 10,737,403 B2 | 8/2020 | Bauer et al. | |
| 10,786,832 B2* | 9/2020 | Nowicki | B65G 43/00 |
| 10,826,370 B2 | 11/2020 | Huber et al. | |
| 11,066,244 B1* | 7/2021 | Kalm | B65G 47/34 |
| 11,136,199 B2 | 10/2021 | Choplin | |
| 11,174,109 B1* | 11/2021 | Robbins | B65G 47/5104 |
| 11,267,657 B2* | 3/2022 | Wang | B65G 35/08 |
| 2019/0134673 A1 | 5/2019 | Nowicki et al. | |
| 2020/0354166 A1 | 11/2020 | Abe et al. | |

FOREIGN PATENT DOCUMENTS

| | | |
|---|---|---|
| EP | 3656709 A1 | 5/2020 |
| EP | 3907162 A1 | 11/2021 |
| JP | 2932362 B2 | 8/1999 |
| JP | 6617249 B1 | 12/2019 |
| WO | 2018167437 A1 | 9/2018 |
| WO | 2020094318 A1 | 5/2020 |
| WO | 2022015460 A1 | 1/2022 |

OTHER PUBLICATIONS

US 2017/0050332 A1, Bauer et al., Feb. 23, 2017.*
Office Action, European Patent Application No. 21827716.8 dated Jul. 10, 2025, European Patent Office, Rijswijk, Netherlands.

* cited by examiner

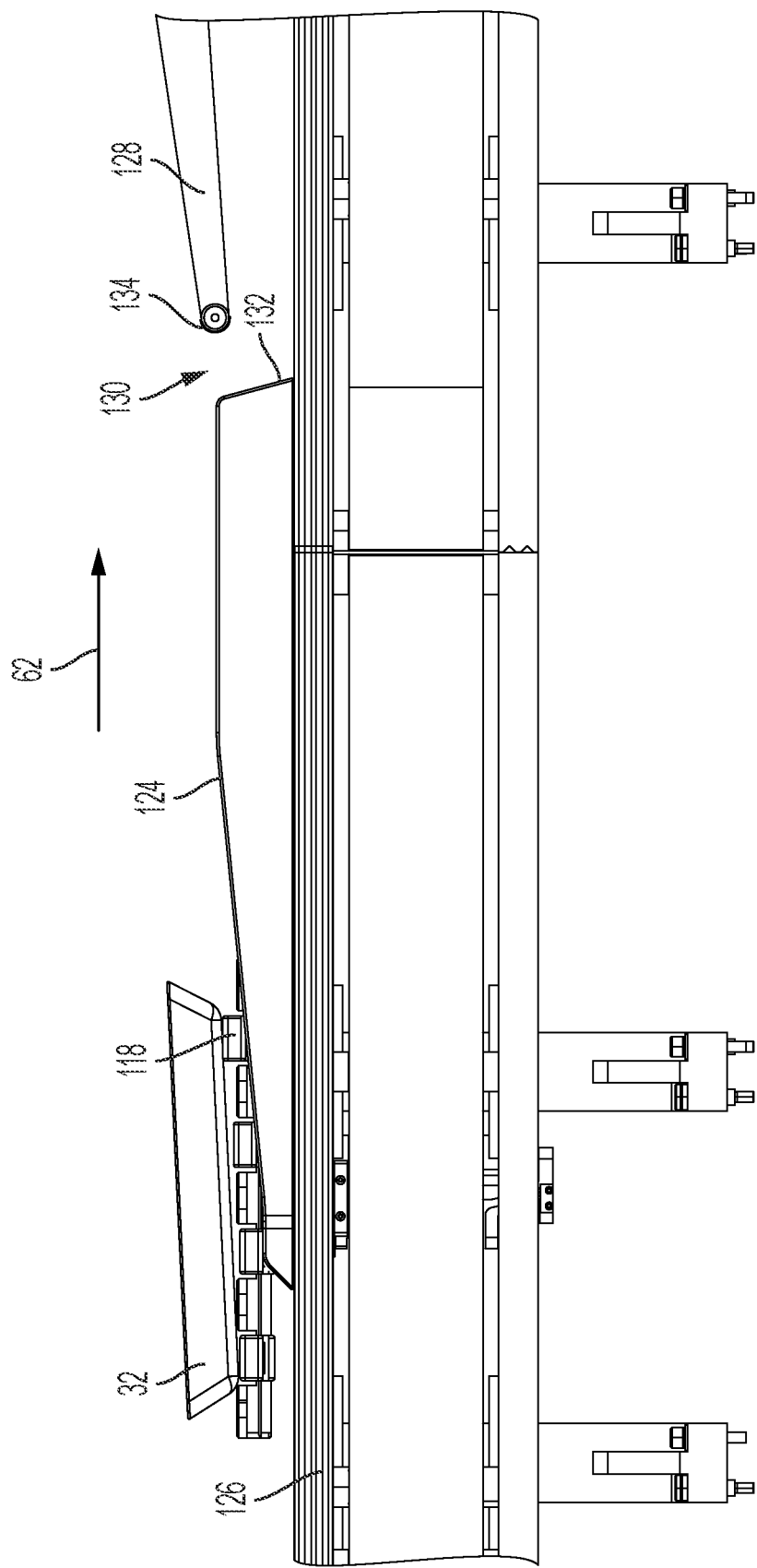

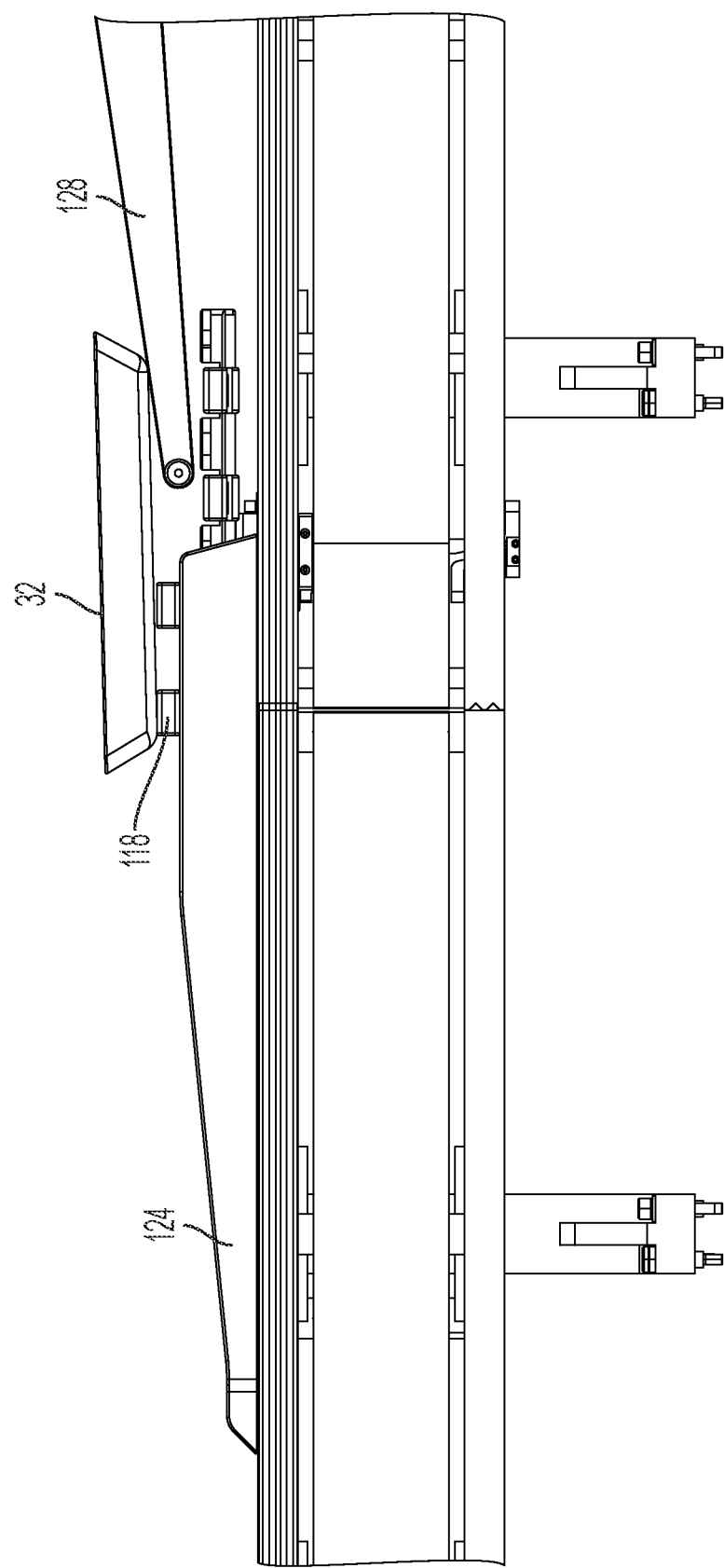

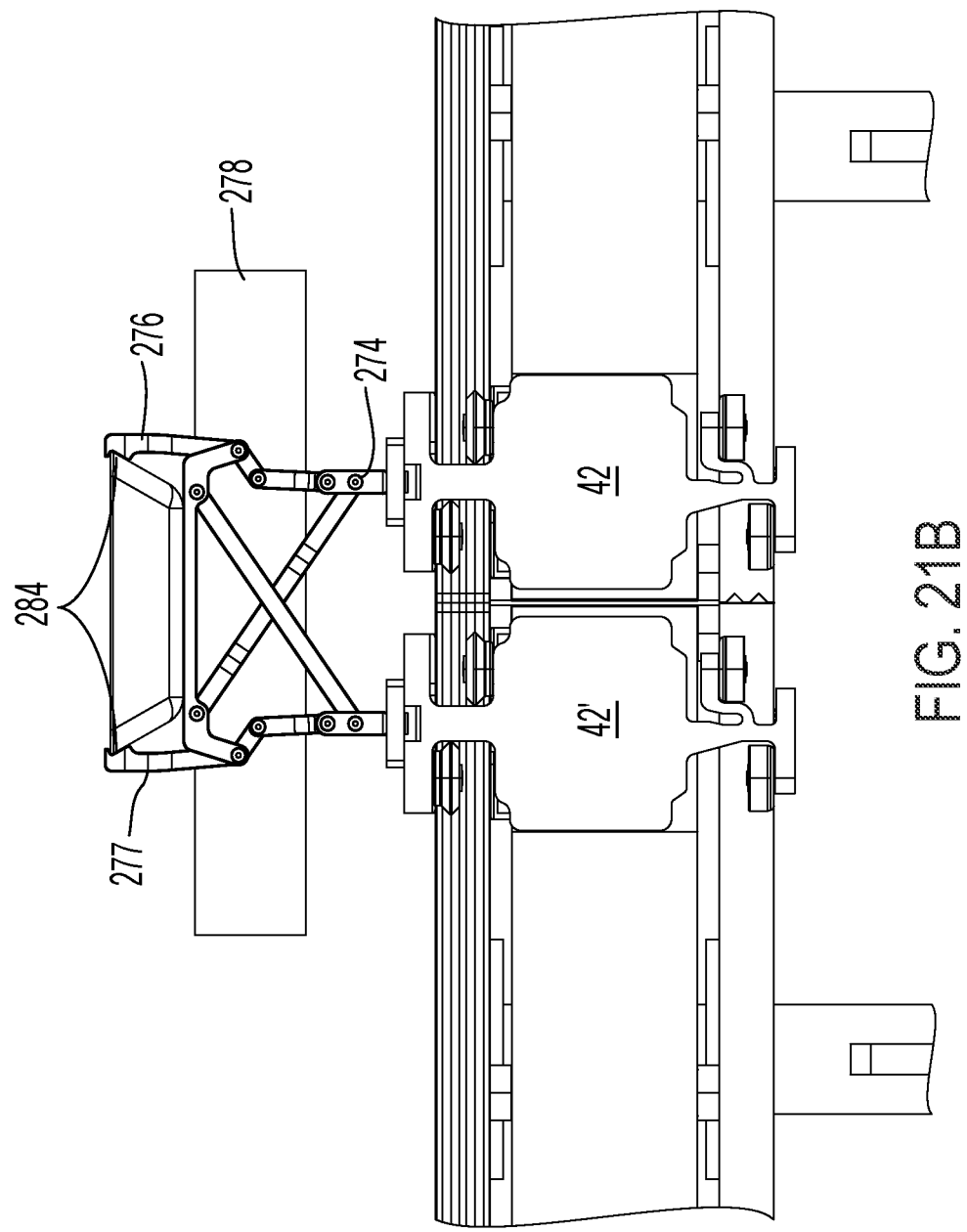

CONVEYOR TRANSFER SYSTEM

BACKGROUND

The invention relates generally to power-driven conveyors. In particular it relates to linear-motor conveyors and transferring tray packs or other conveyed objects between linear-motor conveyors and other conveyors.

Linear-motor conveyors, such as the ACOPOStrak transfer systems manufactured and sold by B&R Industrial Automation GmbH of Eggelsberg, Austria, convey products electromagnetically over a network of linear-motor stator tracks. Shuttles are independently controlled to move around the tracks and transfer from one linear-motor track to another. But the shuttles themselves are not designed to support certain product shapes and sizes or to transfer products between the shuttles and other conveyors.

SUMMARY

One version of a transfer system comprises a linear-motor conveyor, carriers, and a transfer member. The linear-motor conveyor includes a track having one or more infeed or outfeed transfer segments, a stator having drive coils arranged along the track, and a plurality of shuttles driven by the stator along the track. Each of the carriers is mounted to one of the shuttles to support a conveyed object. The transfer member transfers a conveyed object to an outfeed conveyor from one of the carriers at an outfeed transfer segment or from an infeed conveyor to the carriers at an infeed transfer segment.

One version of a carrier for a linear-motor conveyor comprises a support face on which a conveyed object rests, fastening structure attachable to a linear-motor shuttle, and a transfer member moving the conveyed object from the support face to an outfeed conveyor as the carrier advances in a conveying direction.

BRIEF DESCRIPTION OF THE DRAWINGS

FIGS. 9A and 9B are sequential side elevation views of the shuttle of FIG. 7 transferring a tray pack onto an end of a conveyor belt.

FIGS. 21A and 21B are side elevation views of a portion of the transfer system of FIG. 20 showing the sequence of transferring a tray pack off a conveyor belt.

DETAILED DESCRIPTION

Figure 1:
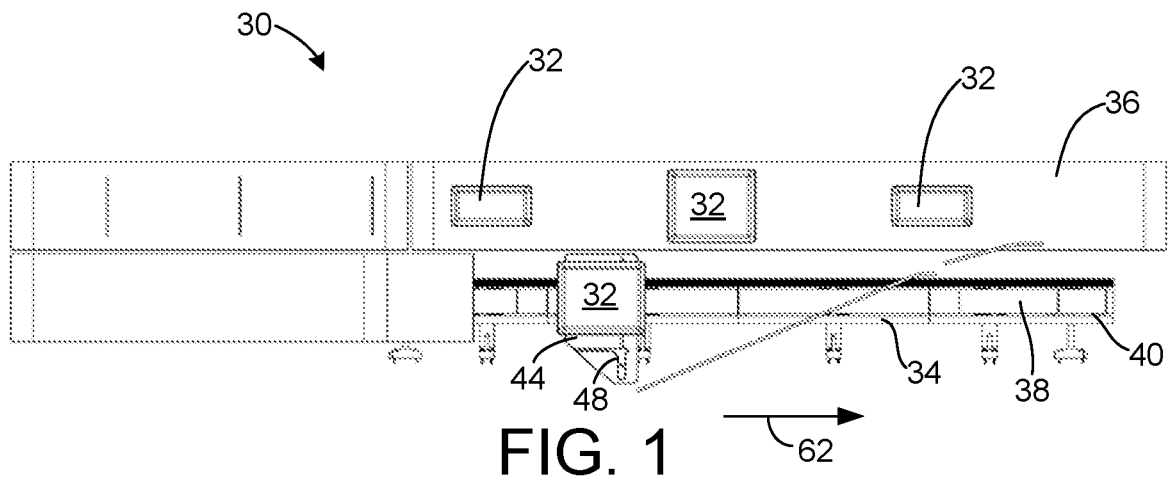
FIG. 1 is a top plan view of one version of a transfer system having a pusher to transfer tray packs or other conveyed objects from a linear-motor conveyor to a conveyor belt.
Figure 2:
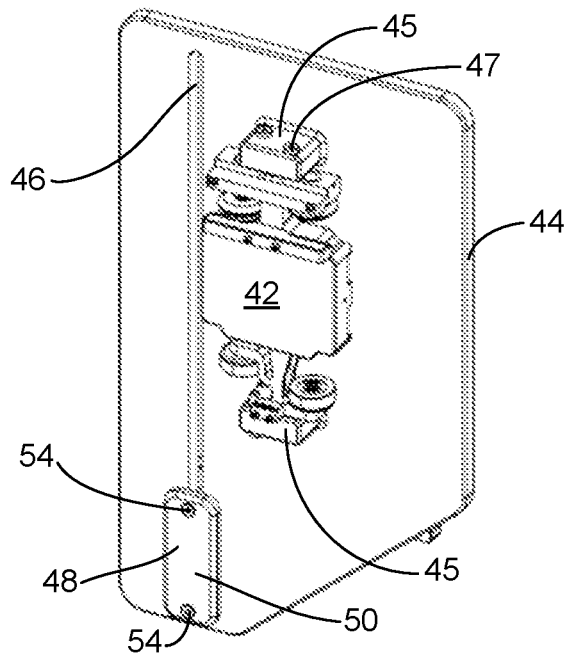
FIG. 2 is an isometric view of a linear-motor shuttle for use with the conveyor of FIG. 1 attached to the bottom of a carrier.
Figure 3:
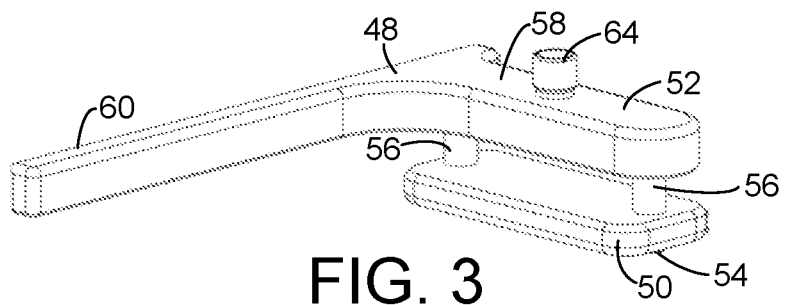
FIG. 3 is an enlarged isometric view of the pusher of FIG. 1.

One version of a transfer system 30 is shown in FIG. 1 transferring tray packs 32 from a linear-motor conveyor 34 to an outfeed conveyor 36. The linear-motor conveyor 34 has a stator 38 extending along a track 40. The stator 38 has drive coils that are arranged along the length of the track. The drive coils of the stator 38 produce an electromagnetic wave that travels along the track 40. A shuttle 42 shown in FIG. 2 is attached to the bottom of a carrier 44 shown in the general form of a plate. The carrier 44 has attachments for mounting to the shuttle 42 in the form of mounting posts 45 projecting from the carrier's bottom side. Screws 47 fasten the carrier 44 to opposite ends of the shuttle 42. The shuttle 42 in this example includes wheels and a permanent magnet whose magnetic field interacts with the stator's traveling electromagnetic wave to produce a force propelling the shuttle along the track 40. Thus, the shuttle 42 forms a linear synchronous motor with the stator 38. (One example of such a linear-motor conveyor is described in U.S. Pat. No. 10,622,921, issued Apr. 4, 2020, to Andreas Weber et al. of B&R Industrial Automation, GmbH. The disclosure of that patent is incorporated into this description by reference.) A slot 46 extends across the width of the carrier 44. A transfer member, in the form of a pusher 48, as also shown in FIG. 3, is arranged to ride along the slot 46 in the carrier 44.

The pusher 48 has a lower base 50 at the bottom side of the carrier 44. The base 50 is fastened to an upper portion 52 by screws 54. The screws 54 extend through hollow spacers 56 that space the lower base 50 from the upper portion 52 a distance slightly greater than the thickness of the carrier 44. For example, the screws 54 can be shoulder screws that extend from the screw heads through bores in the lower base 50, through the spacers 56, and into counterbores in the upper portion 52. The shoulder screws thread into the upper portions 52 above the counterbores in which the shoulder screws bottom out. The shoulder-screw-counterbore arrangement allows the spacers 56 and the lower base 50 to float on the screw's shoulder and prevent the upper portions and the bases from clamping the carrier 44 and hindering the pusher 48 from sliding freely. The spacers 56 ride in the slot 46. The upper portion 52 of the pusher 48 rides along the top side of the carrier 44. The upper portion 52 has an upper base 58 opposite the lower base 50 and into which the screws 54 are threaded. An elongated push bar 60 extends transversely such as perpendicularly, from the upper base 58. The push bar 60 extends over a majority of the length of the carrier 44 in a conveying direction 62 (FIG. 1). A button 64 extending upward from the upper base 58 operates as a cam follower in sliding the pusher 48 along the slot 46. The button 64 may include a peripheral roller as a lower-friction contact with a guiding cam surface.

Figure 4A:
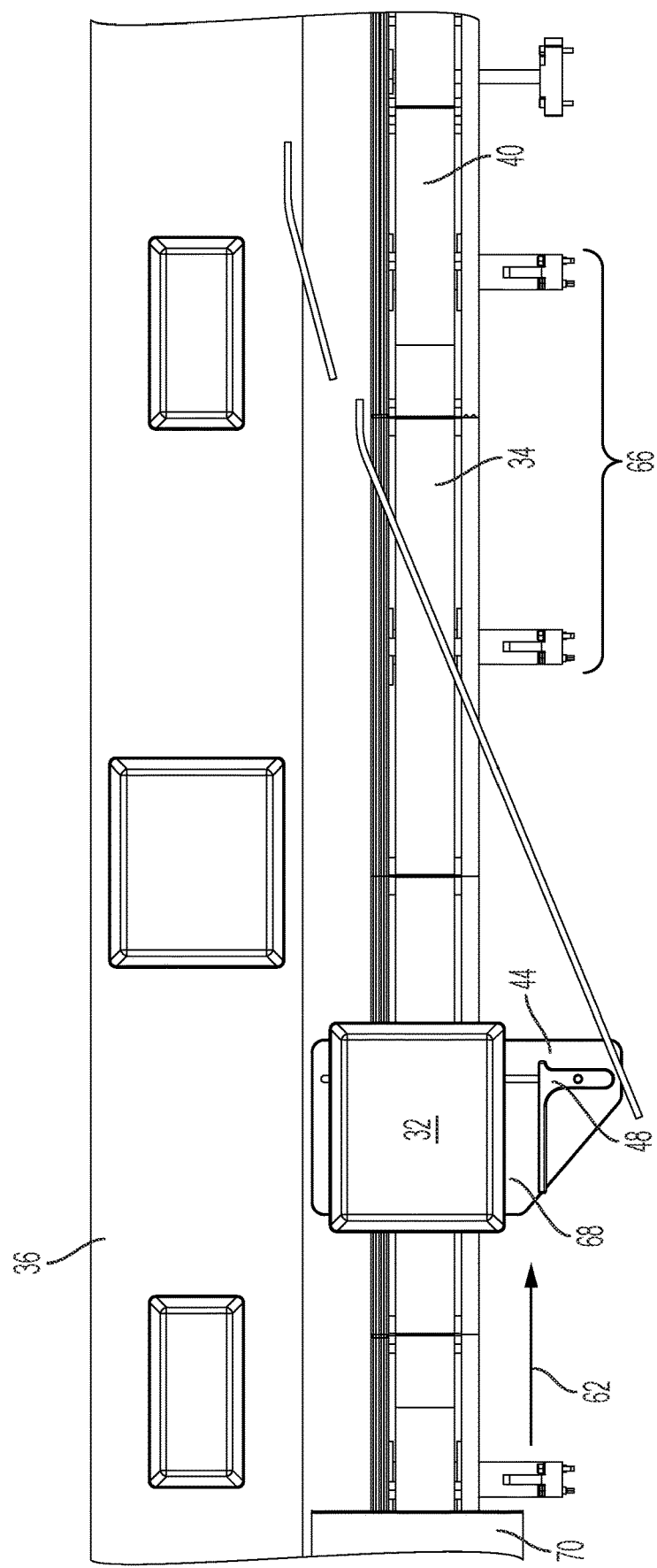
FIGS. 4A-4C are top plan views of the transfer system of FIG. 1 showing the sequence of transferring a tray pack to a conveyor belt.
Figure 4B:
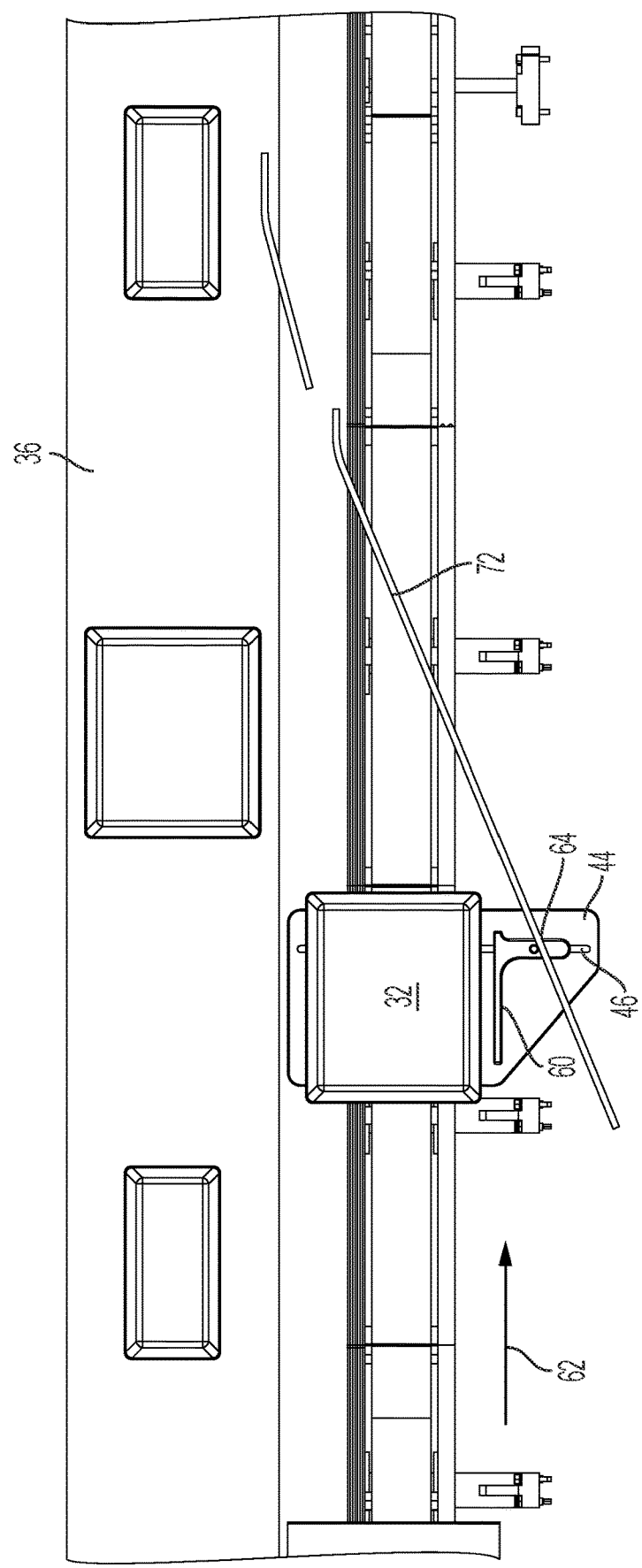
Figure 4C:
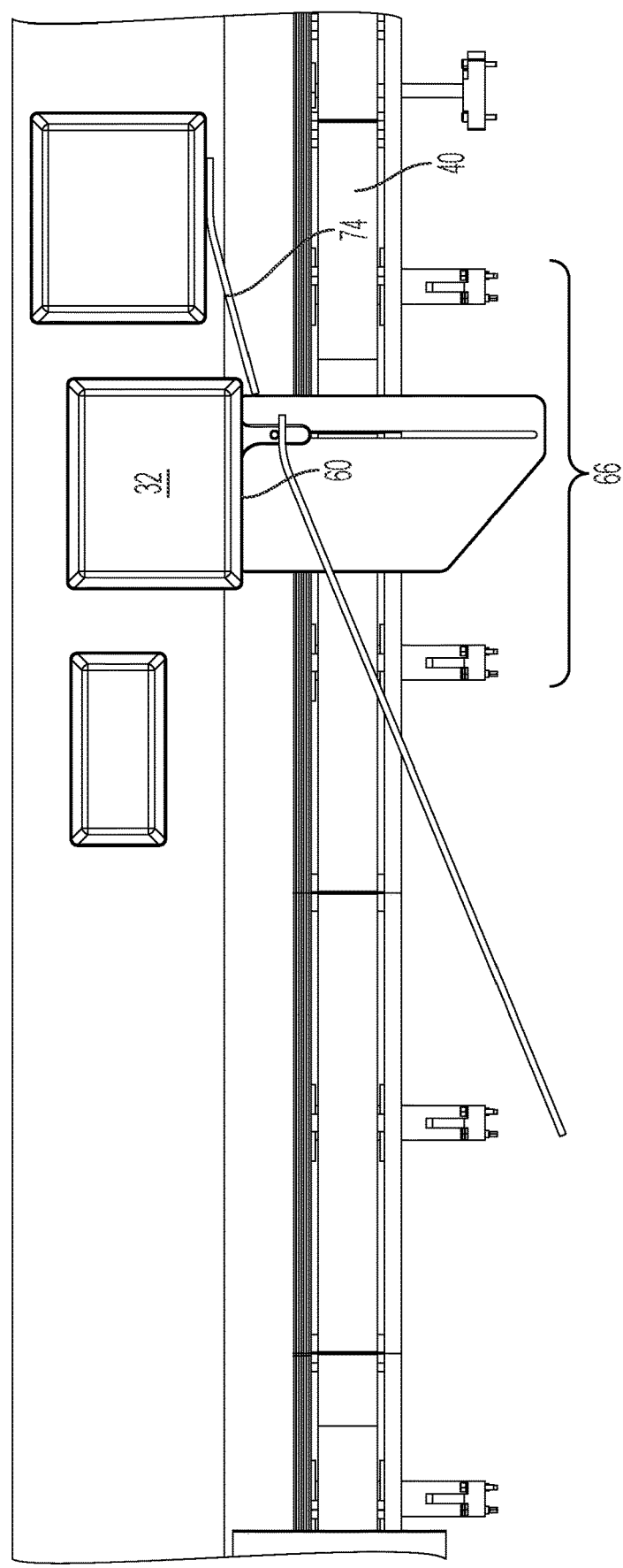

FIGS. 4A-4C illustrate the operation of the transfer system in transferring a tray pack 32 from the linear-motor conveyor 34 to an outfeed conveyor 36, such as a conveyor belt running in the conveying direction 62 in a transfer segment 66 of the linear-motor track 40. As shown in FIG. 4A, a tray pack 32 is supported on a support face, i.e., the top face 68, of the carrier 44 after having been dropped off the end of an infeed conveyor 70 and onto the carrier. As the tray pack is advanced along the track 40 in the conveying direction 62, the button 64 of the pusher 48 engages a guide 72 that crosses the track obliquely toward the outfeed conveyor 36 as shown in FIG. 4B. The contact between the guide 72 and the button 64 slides the pusher 48 along the slot 46 across the width of the carrier 44 and toward the outfeed conveyor 36. The push bar 60 eventually contacts a side of the tray pack 32 and pushes it onto the outfeed conveyor 36 in the transfer segment 66 as the tray pack is conveyed along the track 40. A guide rail 74 at the side of the outfeed conveyor 36 adjacent the linear-motor track 40 extends over a portion of the width of the outfeed conveyor 36 to complete the transfer of the tray pack 32 by guiding it toward the center of the outfeed conveyor.

Figure 5B:
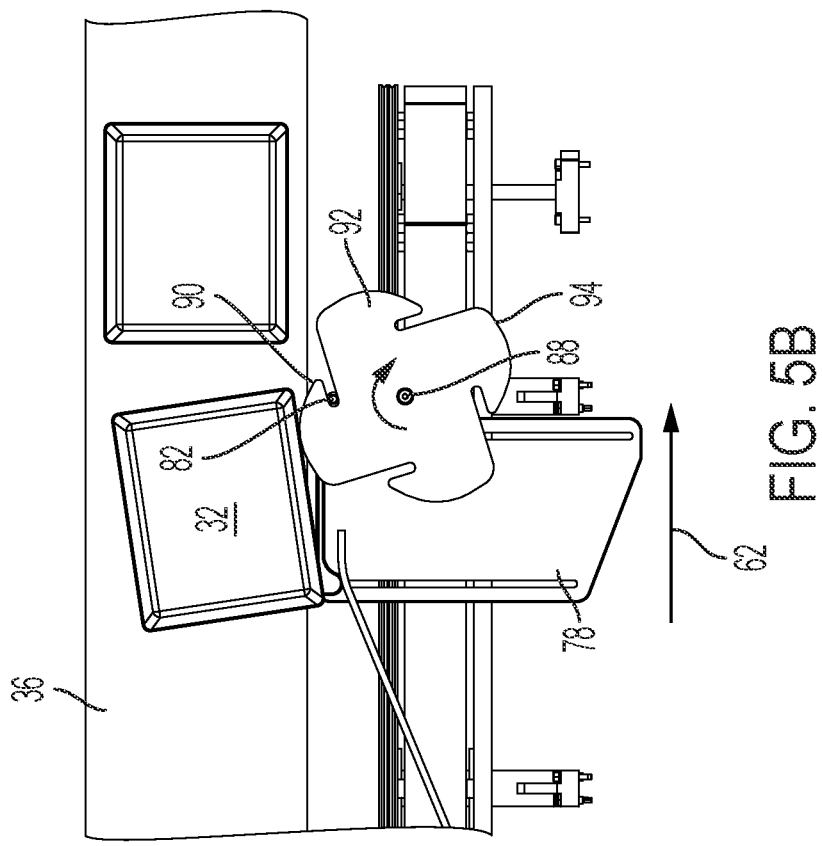
FIGS. 5A-5C are top plan views of a transfer system with a different pusher operating an optional auxiliary clocking wheel to transfer tray packs or other conveyed objects farther onto a conveyor belt.
Figure 5A:
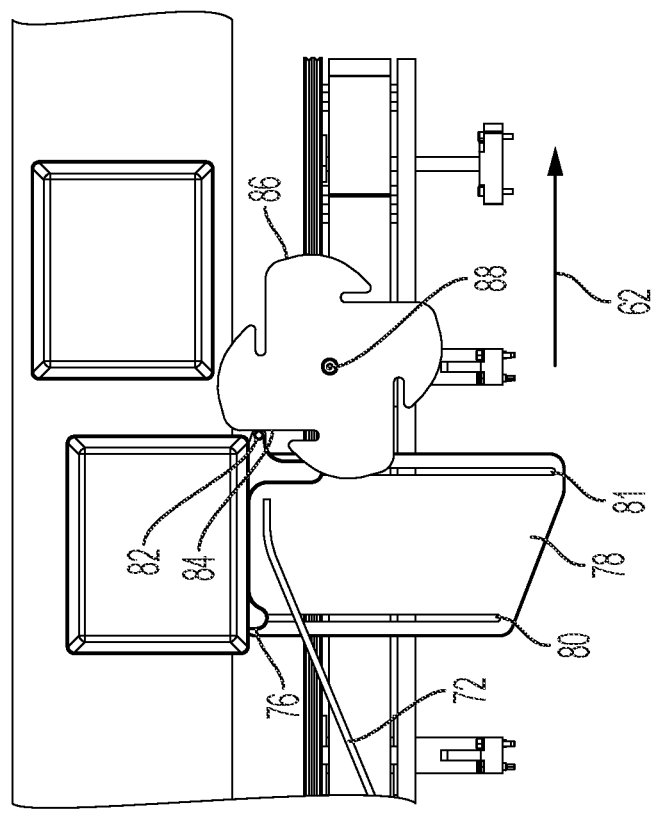
Figure 5C:
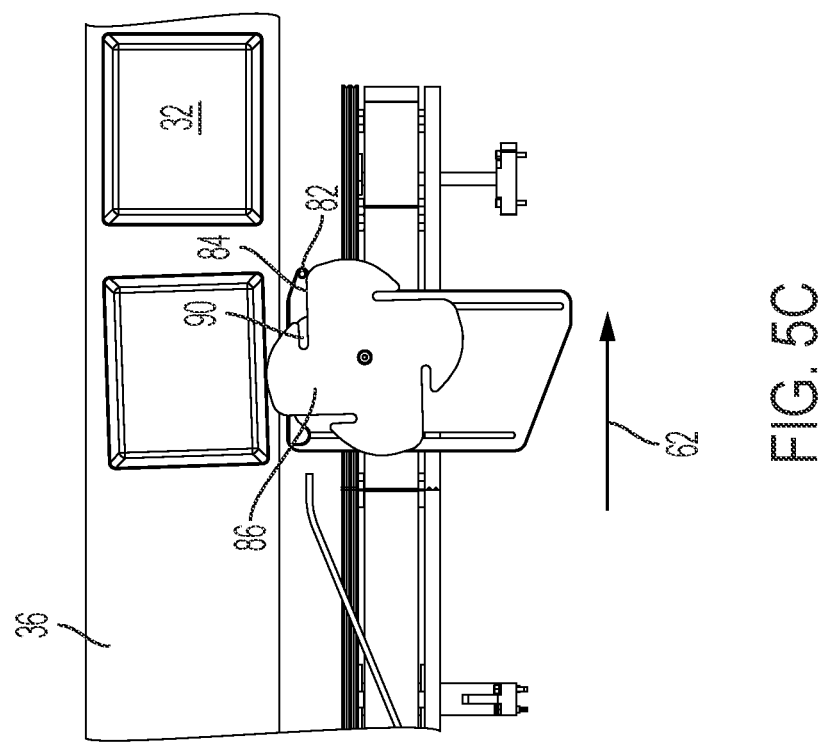

A slightly different movable pusher 76 and carrier 78 are shown in FIGS. 5A-5C. The pusher 76 advances laterally across the carrier 78 along two lateral slots 80, 81 as the carrier advances in the conveying direction 62. After clearing the guide 72, a button 82 on the leading end of the pusher 78 contacts a side face 84 of a clocking wheel 86 that is rotatable about a pivot 88. As the carrier 78 continues to advance in the conveying direction 62, as shown in FIG. 5B, the button 82 rotates the clocking wheel 86 and slides along the side face 84 into a slot 90 between the inner end of the side face and a lobe 92 of the four-lobed clocking wheel 86. Each lobe 92 has a rounded head 94 that extends over a side of the outfeed conveyor 36 and pushes the tray packs 32 laterally farther across as the wheel 86 is rotated to complete the transfer, as shown in FIG. 5C. At the completion of the transfer, the slot 90 and the side face 84 of the clocking wheel 86 are parallel to the conveying direction 62. In that way the button 82 slides out of the wheel slot 90 along the side face 84 and out of engagement with the wheel 86 to leave it oriented in position to receive the next pusher button 82. And the tray packs 32 are pushed to the center of the outfeed conveyor 36 by the clocking wheel's lobe 92.

Figure 6:
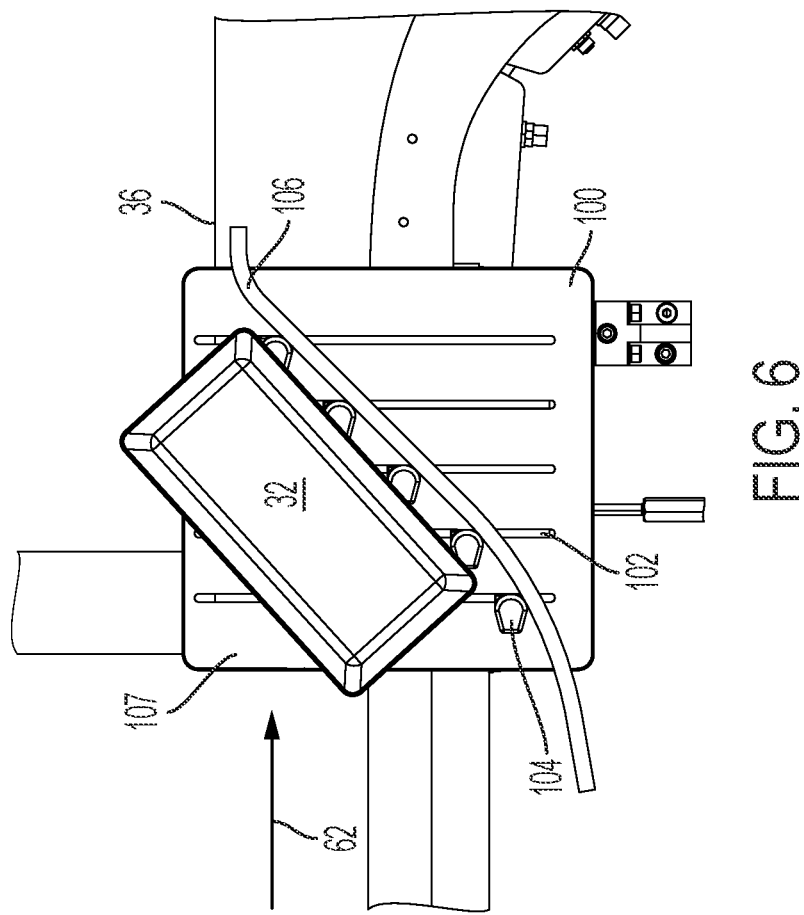
FIG. 6 is a top plan view of another version of a transfer system that uses multiple pushers or shoes to transfer tray packs or other conveyed objects onto an outfeed conveyor.

Another version of a carrier 100 is shown in FIG. 6. The carrier 100 has multiple lateral slots 102 each with a pusher 104, or shoe, as a transfer member riding along one of the slots. An upper portion of each pusher 104 engages a guide 106 above the support face, i.e., the top face 107, of the carrier 100 to guide the pushers and the tray pack 32 laterally across the carrier to transfer it to an outfeed conveyor 36 as the carrier advances in the conveying direction 62.

Figure 8:
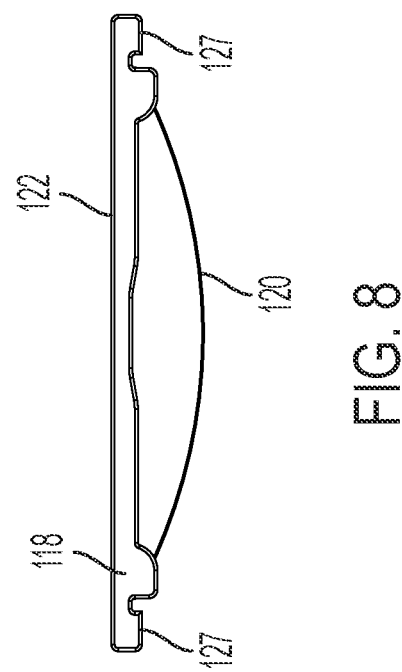
FIG. 8 is an end elevation view of a slat as in FIG. 7.

Another version of a transfer system is shown in FIGS. 7-9B. A carrier 110 is mounted to a linear-motor shuttle 112 by an appropriate fastening structure on the carrier. The carrier 110 includes a series of spaced slats 114 joined from below by a central beam 116 that extends the length of the carrier 110. Laterally elongated lifters 118 serving as transfer members reside in spaces between consecutive slats 114. The slats 114 are fixed slats, and the lifters 118 are movable slats. As best shown in FIG. 8, each lifter 118 has a leaf spring 120 retained to the underside of the lifter at laterally opposite ends. The leaf spring 120 extends through a slot (not shown) in the central beam 116 to retain it in place. The spring 120 is shown in a loaded state in FIG. 8 as when the lifter 118 is in a raised position above the level of the slats 114. In a relaxed state the leaf spring 120 extends across the lifter 118 parallel to the lifter's top face 122.

FIGS. 9A and 9B illustrate the transfer of a tray pack 32 from a linear-motor conveyor at its transfer segment onto an overhead outfeed conveyor 128 over its end 134, rather than over its side. A guide 124 along each side of the linear-motor conveyor 126 guides the ends of the lifters 118 up a shallow ramp as the carrier 110 advances in the conveying direction 62. The bottom faces 127 (FIG. 8) of the ends of the lifters serve as guide followers that slide on the guides 124. The guides 124 raise the lifters 118 against spring pressure to a raised position high enough for the trays 32 to transfer onto the nose end 134 of the overhead outfeed conveyor 128. A gap 130 between a steeply ramped downstream end 132 of the guide 124 and the nose end 134 of the outfeed conveyor 128 allows the lifters 118 to return to a lowered position as in FIG. 7 by the relaxation of the leaf springs 120 biasing the lifters toward the lowered position. In the lowered position the top face 122 of the lifters 118 is flush with or below the top support faces of the slats 114.

Figure 10:
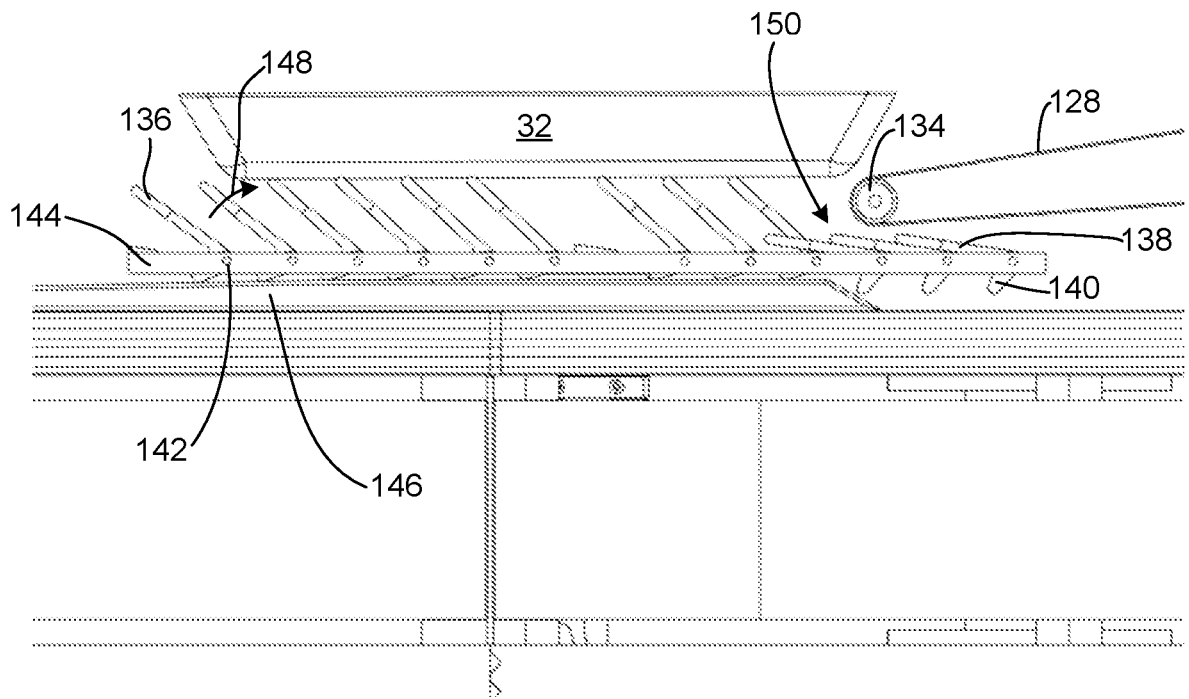
FIG. 10 is a side elevation view of another version of a transfer system having liftable flights supported on a shuttle for transferring a tray pack or other conveyed objects onto an end of a conveyor belt.

A variation of the lifters is shown in FIG. 10. Instead of movable lifter slats, the lifters in FIG. 10 are cam flights 136. The cam flights 136 have an upper panel 138 joined to a lower guide follower 140. The upper panel 138 and the lower guide follower 140 extend oblique or perpendicular to each other. A pivot rod 142 at their junction pivotably connects the lifters 136 to a carrier 144 mounted atop a linear-motor shuttle (not shown). When the lower guide followers 140 encounter a guide 146, they pivot the flights 136 forward, as indicated by the arrow 148, to a raised position lifting the tray pack 32 high enough to transfer over the nose 134 of an outfeed conveyor 128. A gap 150 between the end of the guide ramp 146 and the transfer segment of the outfeed conveyor 128 allows the flights 136 to return by gravity to their lowered positions and avoid contact with the outfeed conveyor.

Figure 11:
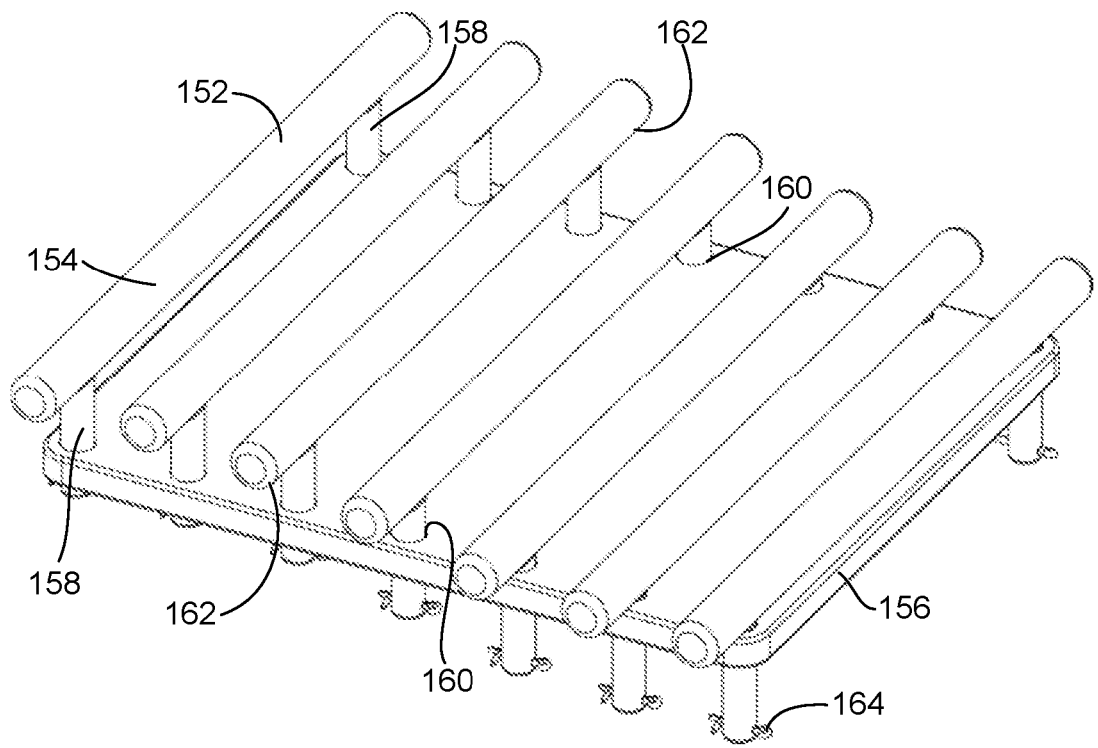
FIG. 11 is an axonometric view of liftable posts as alternative lifting devices to the slats of FIG. 7 and the flights of FIG. 10.

Another version of movable lifting members is shown in FIG. 11. The lifters 152 are bars 154 that extend laterally across the width of a carrier 156. Posts 158 support the bars 154 at opposite ends. The posts 158 are received in holes 160 through the carrier 156. The bottoms 162 of the bars 152 outside the posts 158 serve as guide followers that are pushed up as the bottom ends encounter a guide (not shown) similar to those in FIGS. 9A and 9B and in FIG. 10 to raise the posts and the bars. When out of contact with the guide, the lifters assume a lowered position by the effect of gravity. Tray packs sitting atop the bars 154 are lifted for transfer. Cotter pins 164 through the bottoms of the posts 158 retain the lifters 152 in the holes 160 through the carriers 156.

Figure 12B:
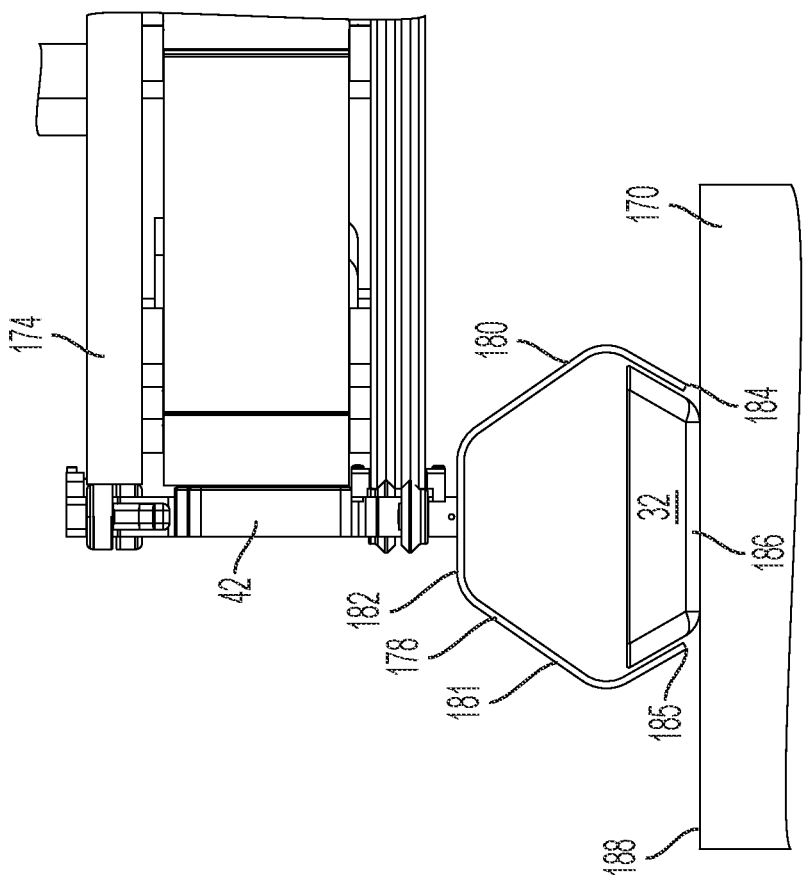
FIGS. 12A and 12B are end elevation views of another version of a portion of a transfer system showing the sequence of transferring a tray pack to an outfeed conveyor.
Figure 12A:
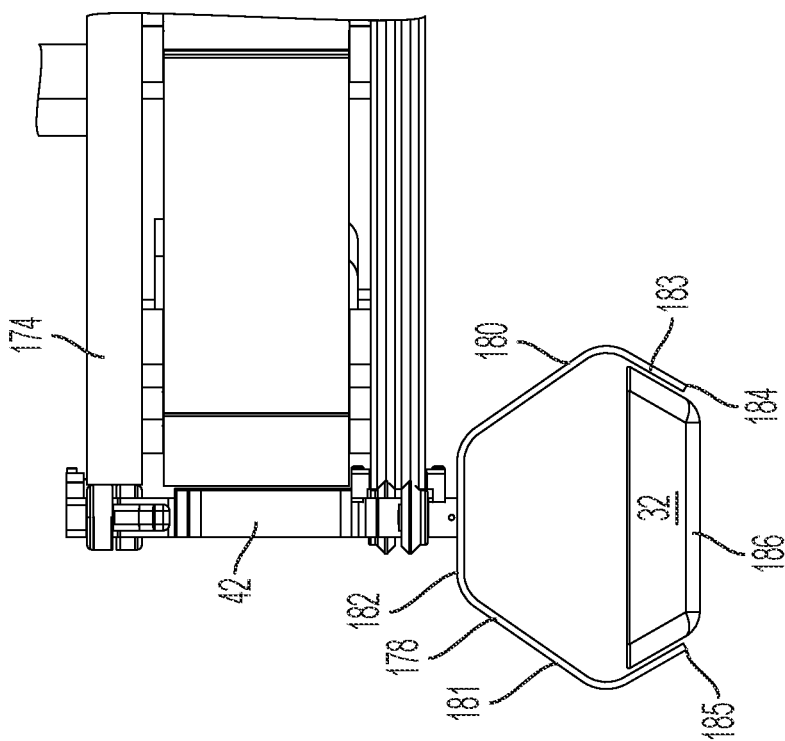
Figure 13:
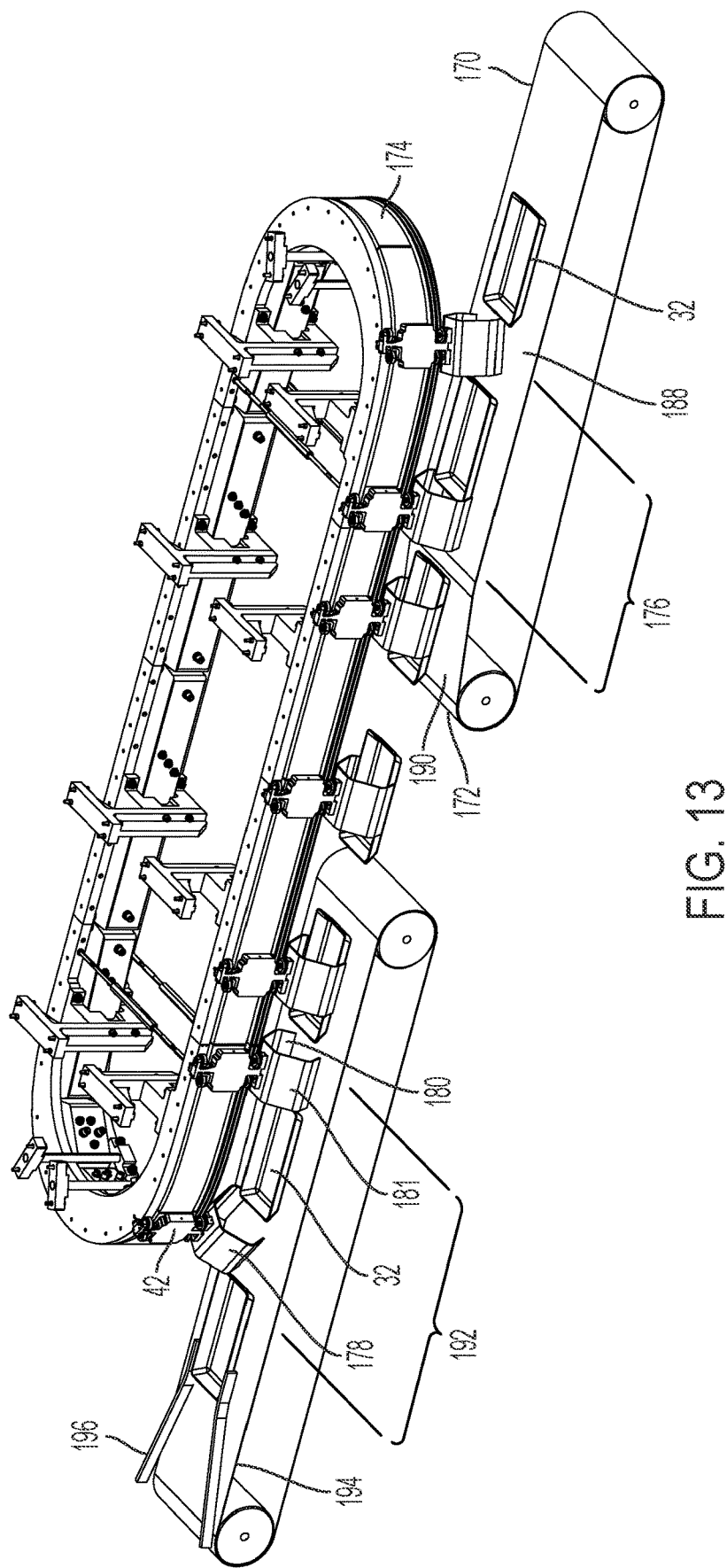
FIG. 13 is an isometric view of a complete transfer system as in FIGS. 12A and 12B.

Another version of a transfer system is shown in FIGS. 12A-13. In this version an outfeed conveyor 170 has an entrance end 172 below a linear-motor conveyor track 174 at a transfer segment 176. A carrier 178 has transfer members characterized by arms 180, 181 suspended from a base 182 attached to a linear-motor shuttle 42. In this example the movable arms 180, 181 are bent panels elongated in the conveying direction. The suspended arms 180, 181 diverge from the base 182 before converging toward distal ends 184, 185 that form hooks. The converging hook ends of the arms 180, 181 are spaced apart and form angles generally matching the angle of the sides of the tray packs 32. In that way the tray packs 32 can hang from the arms 180, 181 with bottoms 186 of the tray packs suspended below the level of the distal ends 184, 185 of the arms, as shown in FIG. 12A. The inner faces 183 of the arms 180, 181 serve as support faces on which the tray packs 32 rest.

A tray pack 32 is transferred onto the outfeed conveyor 170 along the transfer segment 176 from above as shown in FIGS. 12B and 13. When the carrier 178 has positioned the tray pack 32 with its bottom 186 sitting on the upper surface 188 of the outfeed conveyor 170, the shuttle 42 is slowed or stopped to allow the outfeed conveyor to draw the tray pack from the arms 180, 181 clear of the carrier 178 as best shown in FIG. 13. The empty carrier 178 then separates from the outfeed conveyor 170 around a turn in the track 174. A ramped entry 190 at the entrance end 172 of the outfeed conveyor 170 decreases the spacing between the upper surface 188 of the conveyor and the distal ends 184, 185 of the arms 180, 181 so that the tray pack 32 is gradually lifted out of contact with the arms at the upper end of the ramped entry. In that way the tray pack 32 can be cleanly released from the arms 180, 181.

The transfer system of FIG. 13 also shows an infeed segment 192 at which a tray pack 32 is transferred from an infeed conveyor 194 to the carriers 178. Like the outfeed conveyor 170, the infeed conveyor 194 runs parallel to and below the linear-motor conveyor track 174 along the infeed segment 192. Although shown as collinear in FIG. 13, the infeed conveyor 194 and the outfeed conveyor can be positioned along other sections of the track 174, such as on the opposite side. As the carriers 178 swing into position over the infeed conveyor 194 from the turn in the track 174, they are slowed relative to the infeed conveyor to collect the tray packs 32. Alternatively, the carriers 178 could be sped up relative to the infeed conveyor 194 to collect the tray packs 32, but that would require a longer infeed segment. A plow 196 at the entrance end of the infeed conveyor 194 singulates and positions the tray packs 32 in line with the carriers 178.

Figure 14:
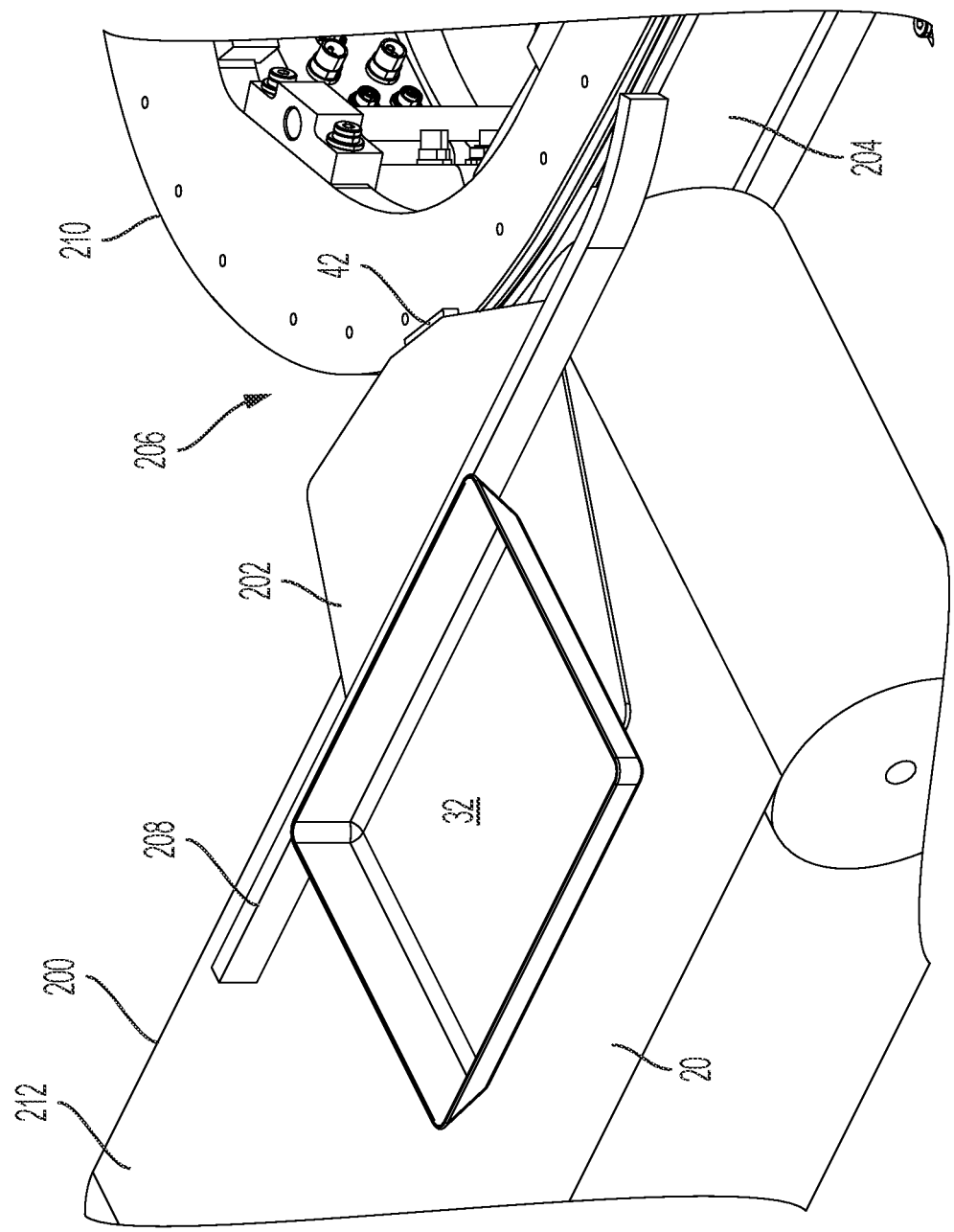
FIG. 14 is an isometric view of another version of a transfer system that swipes tray packs or other conveyed objects from a linear-motor conveyor to a belt conveyor.

The transfer system shown in FIG. 14 transfers tray packs 32 onto an outfeed conveyor 200 from a carrier 202 in the form of a plate. The plate 202 is attached to a shuttle 42 driven along a linear-motor track 204. The transfer occurs along a transfer segment 206 at the entrance end of the outfeed conveyor 200. A side rail 208 extends along a length of the entrance end of the outfeed conveyor 200. The track 204 diverges from the side of the outfeed conveyor 200 at a turn 210. The plate 202 is thin enough to fit between the bottom of the side rail 208 and the upper surface 212 of the outfeed conveyor 200. As the plate 202, driven by the shuttle 42, makes the turn, the side rail 208 strips the tray pack 32 from the plate and onto the outfeed conveyor 200 to complete the transfer.

Figure 15:
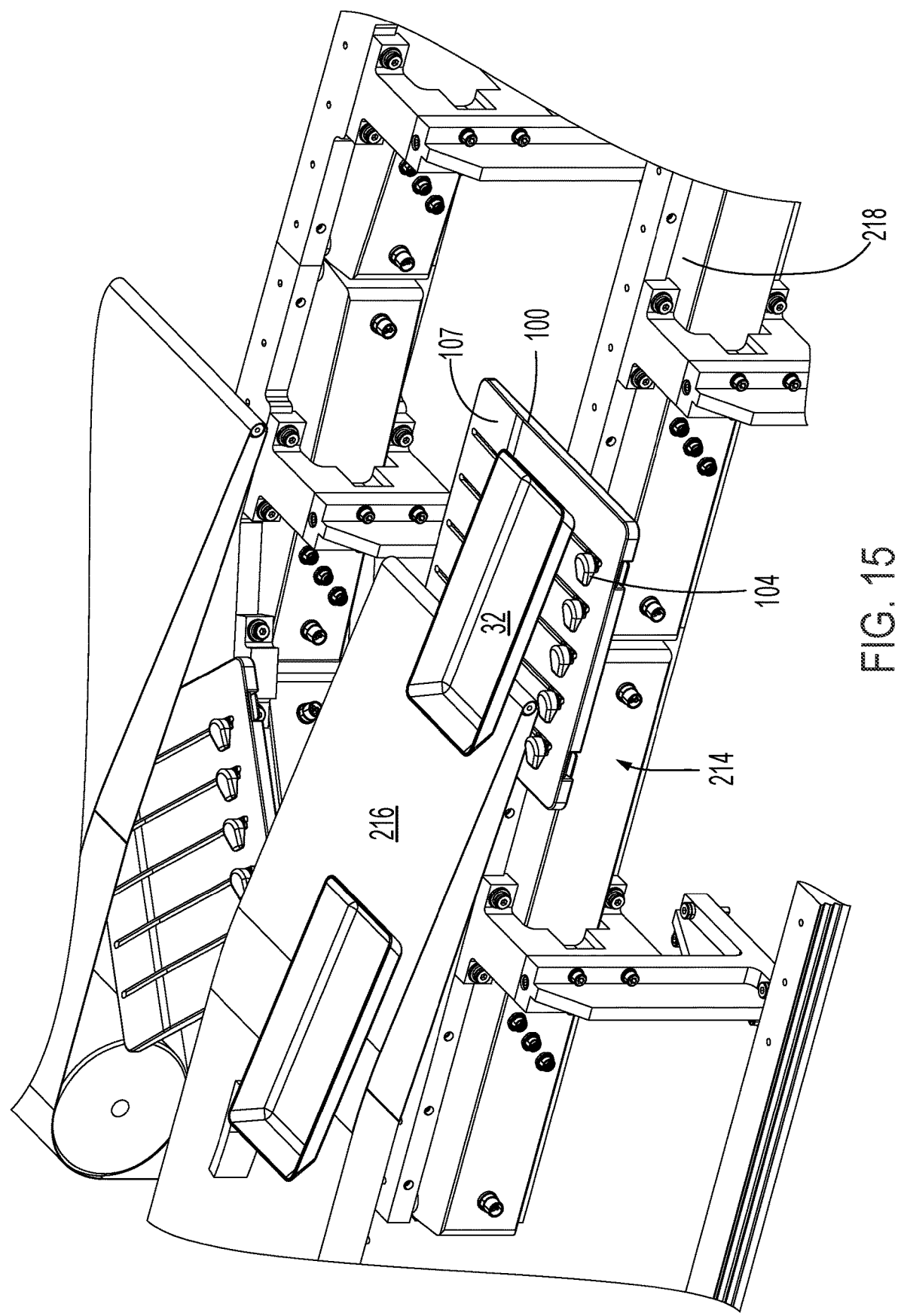
FIG. 15 is an axonometric view of a portion of a transfer system as in FIG. 6 showing the transfer of a tray pack from a conveyor belt to a linear-motor conveyor.

FIG. 15 shows a carrier 100 as in FIG. 6 with multiple pushers 104 as transfer members receiving a tray pack 32 at an infeed transfer segment 214 at the exit end of an infeed conveyor 216 onto the top support face 107. The infeed conveyor 216 is parallel to and elevated above the linear-motor track 218. Tray packs 32 conveyed off the end of the infeed conveyor 216 slide onto the carrier 100 slightly below.

Figure 16:
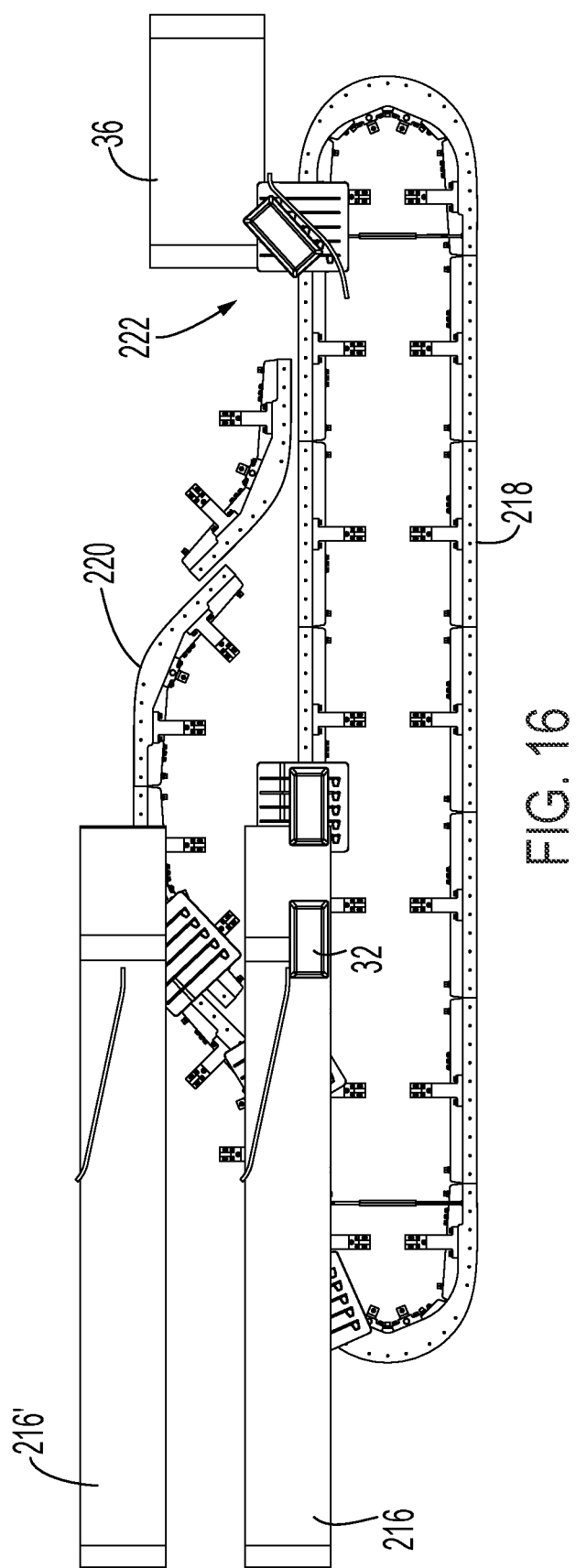
FIG. 16 is a top plan view of a complete transfer system as in FIG. 15.

FIG. 16 shows an example of a complete transfer system that includes two infeed conveyors 216, 216' as in FIG. 15 and a single outfeed conveyor 36 as in FIG. 6. The linear-motor track system includes a racetrack 218 and a shunt track 220. The shunt track 220 accommodates tray packs delivered from above by the second infeed conveyor 216' and rejoins the racetrack 218 just upstream of the transfer segment 222 at which tray packs 32 are transferred to the outfeed conveyor 36 as described previously with respect to FIG. 6.

Figure 7:
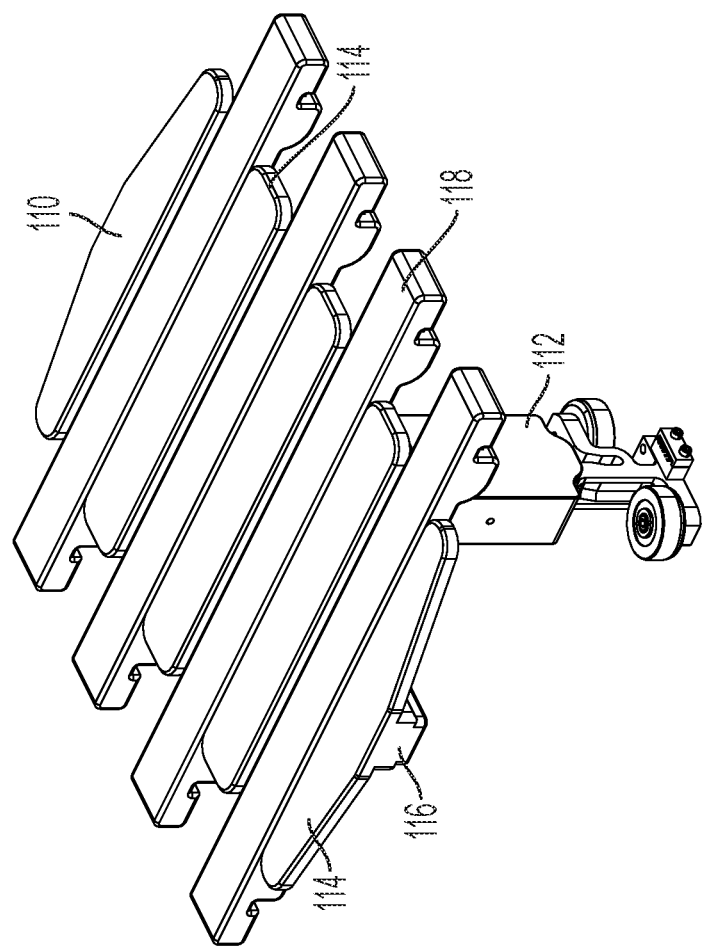
FIG. 7 is an isometric view of a linear-motor shuttle supporting liftable slats usable in another version of a transfer system.
Figure 17:
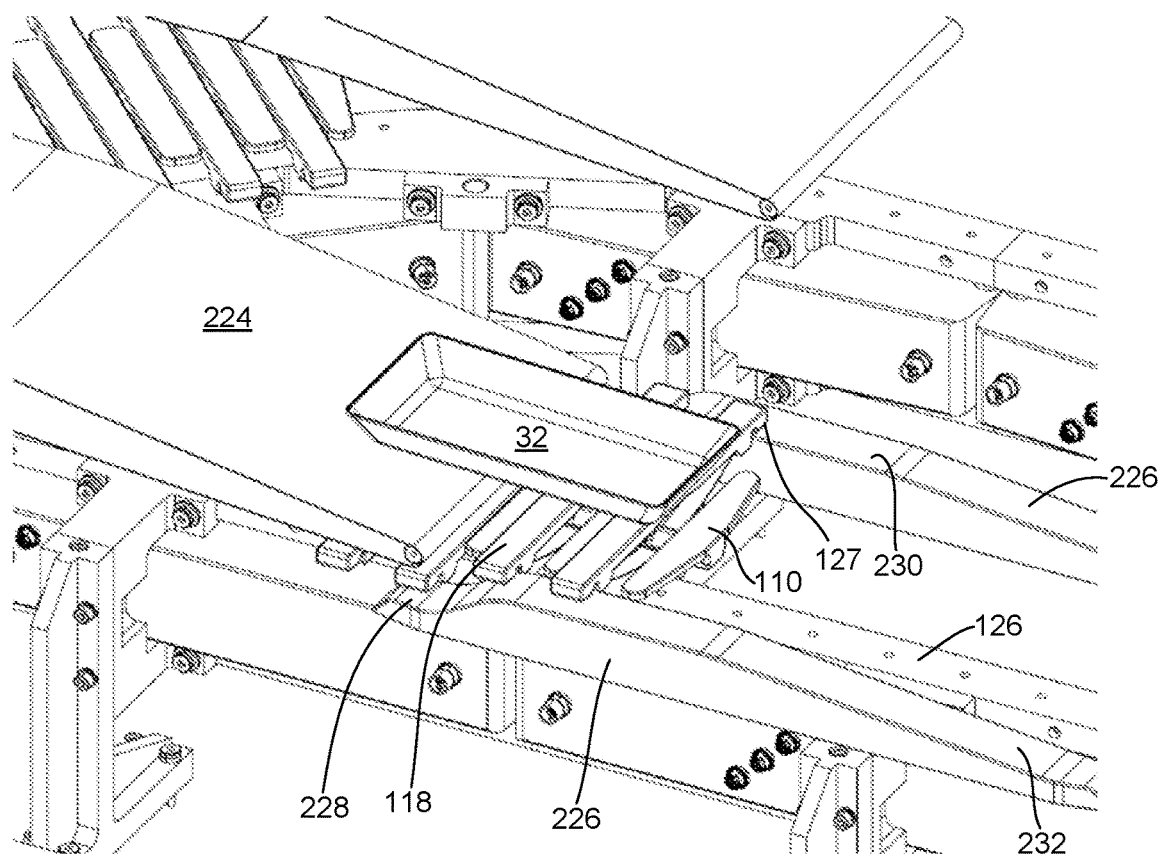
FIG. 17 is an axonometric view of a portion of the transfer system of FIGS. 9A and 9B showing the transfer of a tray pack from a conveyor belt onto a linear-motor conveyor.
Figure 18:
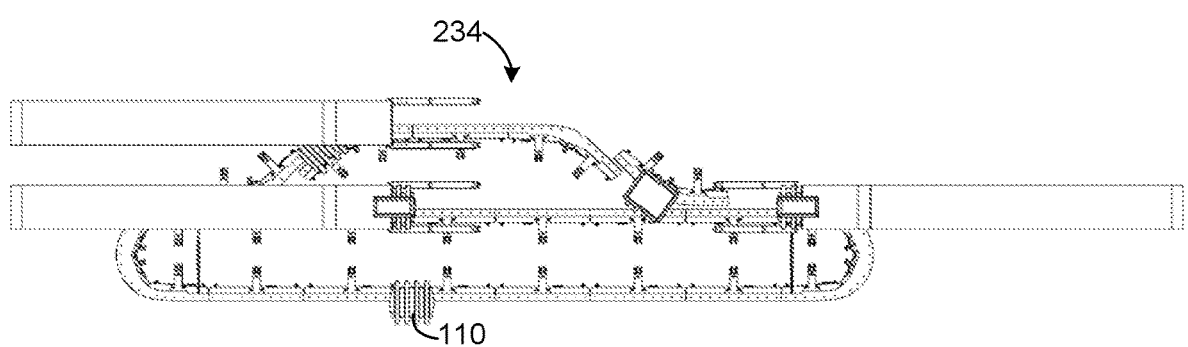
FIG. 18 is a top plan view of a complete transfer system as in FIG. 17.

The transfer of a tray pack 32 from an infeed conveyor 224 onto a carrier 110 as in FIG. 7 is shown in FIG. 17. Guides 226 on opposite sides of the linear-motor track 126 elevate the lifters 118, the transfer members, to a raised position to receive the tray packs 32 exiting the exit end of the infeed conveyor 224 above with a minimal step down for a smooth transfer. Each guide 226 has an entrance ramp 228 that causes the lifters 118 to rise quickly from their lowered positions to their raised positions by contact with the bottom faces 127 of the lifters acting as guide followers. The guide 226 is constant in height over a level portion 230 downstream of the entrance ramp 228 long enough to support tray packs 32 level at the completion of the transfer. The guide 226 terminates downstream of the level portion 230 in a gradually declining exit ramp 232 that allows the lifters' leaf springs to gradually relax as the lifters 118 smoothly return to the lowered position. FIG. 18 shows an exemplary transfer system 234 like the one in FIG. 16 but using the carriers 110 of FIG. 7.

Figure 19:
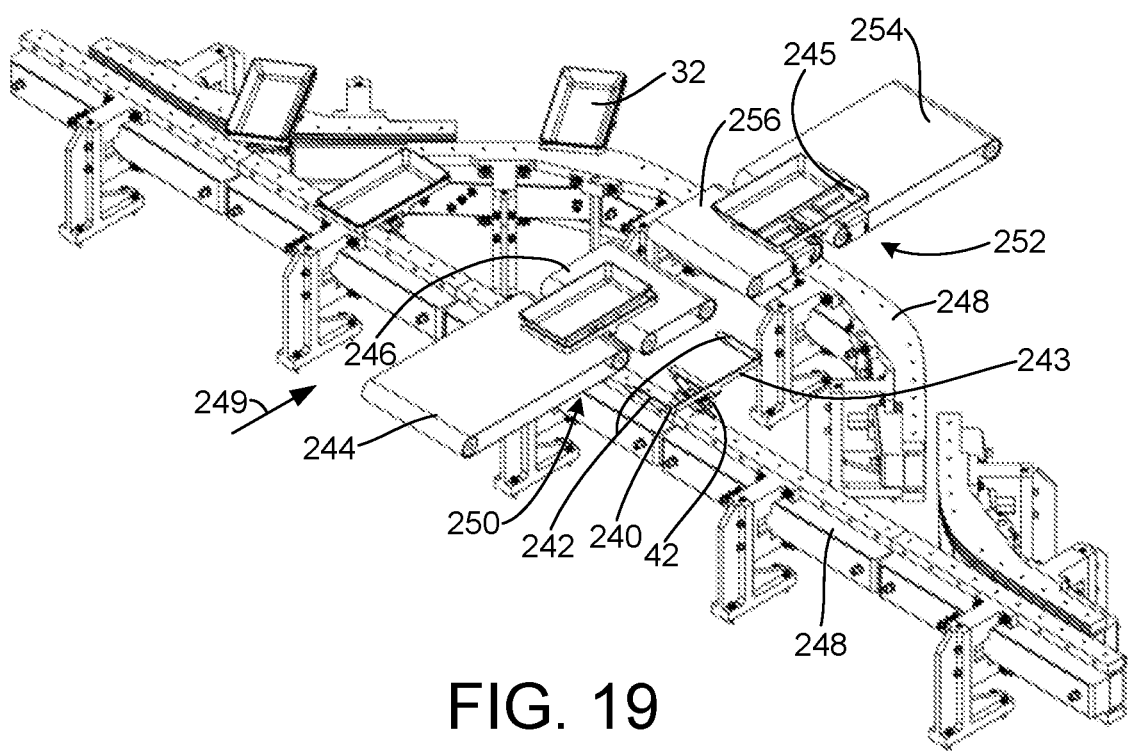
FIG. 19 is an isometric view of another version of a transfer system using forks to transfer tray packs between conveyor belts and linear-motor conveyors.

Another example of a transfer system is shown in FIG. 19 with forked carriers 240 fastened to linear-motor shuttles 42. The carriers 240 each have a fork with two tines 242 extending from a base 243 and spaced apart a distance that corresponds to the length or width of a tray pack 32. Inner faces 245 of the tines 242 are angled to match the angled sides of the tray packs 32 and serve as support faces for the tray packs. An infeed conveyor includes an upstream belt 244 and a downstream belt 246 separated by a gap above a linear-motor track 248 along which the carriers 240 are driven by the shuttles 42 transverse to the direction of travel 249 of the infeed conveyor 244, 246. When the tray pack 32 is centered above the track 248 below at an infeed transfer segment 250, the tines 242 of the fork 240 embrace the sides of the tray pack and remove it from the infeed conveyor. The tines 242 are shaped to match the sides of the tray pack 32. When clear of the infeed belts 244, 246, the bottom of the tray pack sits below the level of the tines 242 in a similar way as for the carrier 178 of FIG. 12A.

Tray packs 32 are transferred off the carriers 240 at an outfeed transfer segment 252 of the track 248. An outfeed conveyor includes two conveyor belts 254, 256 separated across a narrow gap centered above the track 248. The outer faces of the outfeed conveyor belts 254, 256 are at a level slightly below the level of the outer faces of the infeed conveyor belts 244, 246. The infeed-conveyor level is higher to provide the fork tines 242 with some clearance below the rim of the tray packs 32 for a clean pick-up. Once picked up, the tray packs 32 drop slightly into a fully supported position between the tines 242 upon clearing the infeed conveyor. The outfeed-conveyor level is lower to allow the tray packs 32 to be carried over the outfeed conveyor without being pushed off by the belts 254, 256. As the forked carrier 240 is driven through the outfeed transfer segment 252, the bottom of the suspended tray pack 32 contacts a pair of static pads 255 suspended over the edges of the outfeed conveyor belts 254, 256. The pads 255 block the tray pack 32 and strip it from the tines 242 of the carriers 240 as they continue to move along the track 248. Once the tines 242 are clear of the blocked tray pack 32, the tray pack drops completely onto the outer faces of the belts 254, 256 to complete the transfer.

Figure 20:
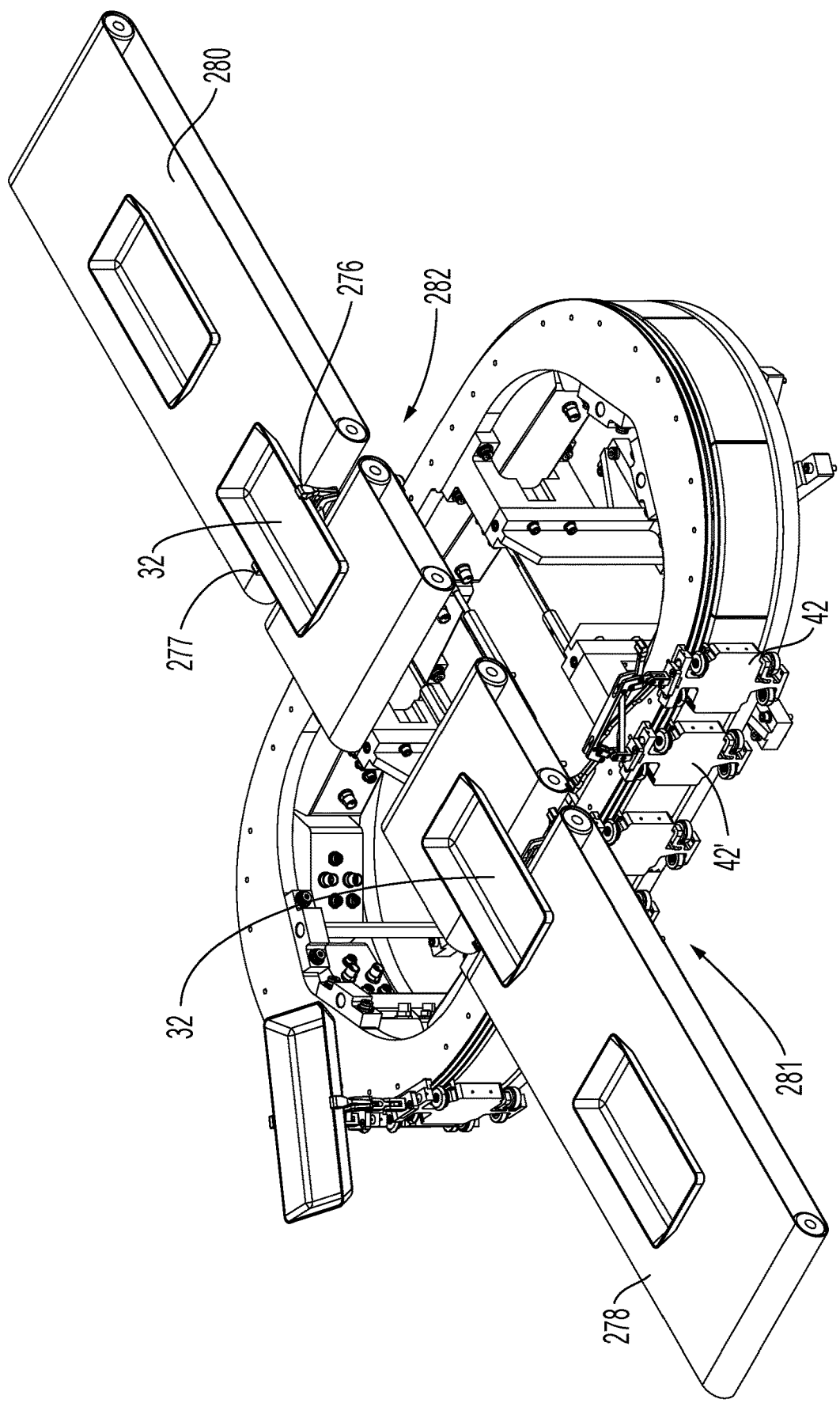
FIG. 20 is an isometric view of another version of a transfer system that uses opposing arms in a linkage connected to consecutive shuttles to transfer tray packs or other conveyed objects between conveyor belts and a linear-motor conveyor.
Figure 21A:
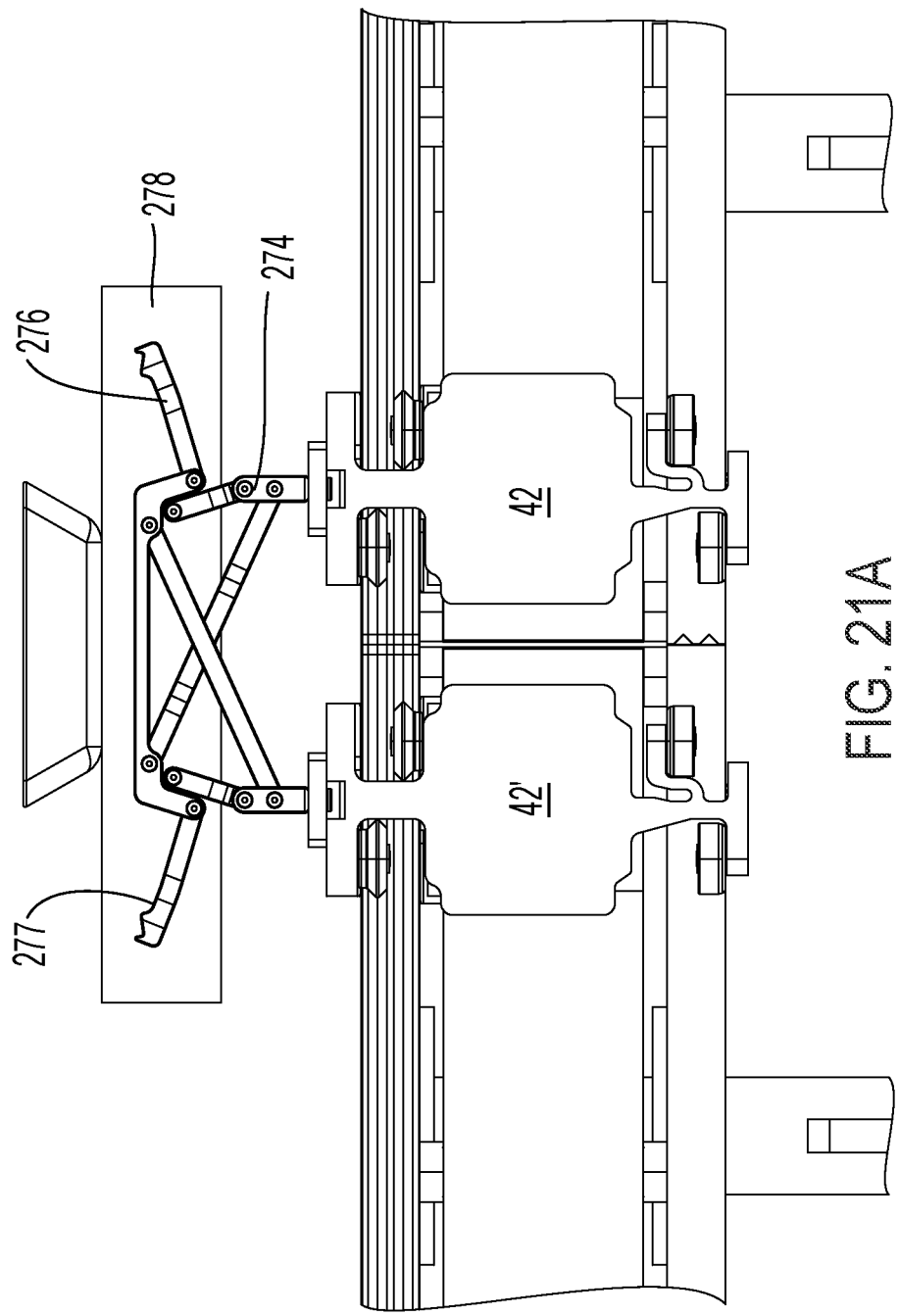

A version of a transfer system that uses pairs of shuttles operating together in tandem is shown in FIGS. 20, 21A, and 21B. In this version the carrier is a multi-bar linkage 274 is mounted to two consecutive shuttles 42, 42' simultaneously. The linkage includes two upper gripping arms 276, 277 as transfer members that are moved between a release position, shown in FIG. 21A, and a clamp position, shown in FIG. 21B, by controlling the spacing between the two shuttles 42, 42'. When the shuttles 42, 42' are separated by a first spacing as in FIG. 21A, the ends of the arms 276, 277 are tilted away from each other in the release position to receive a tray pack 32 from an infeed conveyor 278 above or to release a tray pack onto an outfeed conveyor 280 above. When the shuttles 42, 42' are moved closer together separated by a lesser second spacing, the linkage 274 pivots the two arms 276, 277 toward each other to the clamp position shown in FIG. 21B to grip a tray pack 32 at the track's infeed transfer segment 281 between two support faces 284 at the ends of the arms and carry it to an outfeed transfer segment 282, where it can be transferred to the outfeed conveyor 280.

The various versions of transfer systems have been described with respect to the transfer of tray packs as convenient examples of conveyed objects. But the various transfer systems can be used to transfer other conveyed objects, such as boxes, cartons, bags envelopes, and raw or unpackaged food products. And the infeed and outfeed conveyors, which have been described by way of example as belt conveyors, could alternatively be realized as roller conveyors, slat conveyors, flat-belt conveyors, or modular-belt conveyors, as further examples.

What is claimed is:
1. A transfer system comprising:
    a linear-motor conveyor including:
        a track having one or more infeed or outfeed transfer segments;
        a stator having drive coils arranged along the track;
        a plurality of shuttles unconnected with each other and driven by the stator along the track in a conveying direction;
    a plurality of carriers, each mounted to an individual one of the shuttles to support a conveyed object;
    a transfer member;
    wherein the transfer member transfers a conveyed object to an outfeed conveyor from one of the carriers at an outfeed transfer segment or from an infeed conveyor to the carriers at an infeed transfer segment.

2. The transfer system as claimed in claim 1 comprising an outfeed conveyor and wherein the transfer member is disposed on the carrier and moves the conveyed object to the outfeed conveyor at the outfeed transfer segment.

3. The transfer system as claimed in claim 2 comprising a guide at the outfeed transfer segment and wherein the outfeed conveyor is laterally adjacent the track at the outfeed transfer segment and wherein the transfer member includes one or more pushers each having a guide follower that rides along the guide as the shuttle advances along the outfeed transfer segment, wherein the guide is arranged to guide the pusher laterally across the carrier to push the conveyed object to the outfeed conveyor.

4. The transfer system as claimed in claim 2 comprising a guide at the outfeed transfer segment and wherein the outfeed conveyor has a nose end above the track at the outfeed transfer segment and wherein the transfer member includes one or more lifters each having a guide follower that rides up the guide as the shuttle advances along the outfeed transfer segment, wherein the guide is arranged to raise the lifters from a lowered position to a raised position to elevate the conveyed object to the entrance end of the outfeed conveyor.

5. The transfer system as claimed in claim 4 wherein the lifters are slats supporting the conveyed object and wherein the lifters include springs biasing the lifters toward the lowered position.

6. The transfer system as claimed in claim 4 wherein the lifters are pivoted from the lowered position to the raised position as the guide follower rides up the guide and wherein the lifters assume the lowered position once the guide follower exits the guide.

7. The transfer system as claimed in claim 2 comprising a clocking wheel at the outfeed transfer segment rotated by the carriers passing through the transfer segment, wherein the clocking wheel has lobes that push the conveyed objects farther across the width of the outfeed conveyor as the clocking wheel is rotated.

8. The transfer system as claimed in claim 1 wherein the outfeed conveyor has an entrance end below the track at the outfeed transfer segment and wherein the carrier includes suspended arms converging toward distal ends and supporting the conveyed object at laterally opposite sides with the bottom of the conveyed object suspended below the distal ends of the arms and wherein the shuttle advances the conveyed object onto the entrance end of the outfeed conveyor and separates the arms from the conveyed object by slowing or stopping to allow the outfeed conveyor to draw the conveyed object from the arms.

9. The transfer system as claimed in claim 8 wherein the conveyed object is a tray pack and wherein the laterally opposite sides of the tray pack and the converging arms of the transfer member are angled at the same angle.

10. The transfer system as claimed in claim 1 wherein the outfeed conveyor extends transverse to the track at the outfeed transfer segment above the level of the track and wherein the carrier includes a fork with two tines for supporting a conveyed object with its bottom below the bottom level of the two tines and at the level of the outfeed conveyor to leave the conveyed object on the outfeed conveyor as the tines advance past the outfeed conveyor.

11. The transfer system as claimed in claim 1 comprising a side rail extending along the outfeed conveyor from an entrance end of the outfeed conveyor along and spaced apart from the outfeed conveyor across a gap and wherein the carrier is a plate that fits in the gap at the outfeed transfer segment and wherein the track diverges from the outfeed conveyor at the outfeed transfer segment to slide the plate from under the conveyed object and over the entrance end of the outfeed conveyor and through the gap to leave the conveyed object on the outfeed conveyor.

12. The transfer system as claimed in claim 1 comprising an infeed conveyor above the track at the infeed transfer segment at which conveyed objects are transferred to the carriers from an exit end of the infeed conveyor.

13. The transfer system as claimed in claim 12 comprising a guide at the infeed transfer segment and a transfer member on the carrier including one or more lifters each having a guide follower that rides up the guide as the shuttle advances along the transfer segment, wherein the guide is arranged to raise the lifters from a lowered position to a raised position at the level of the exit end of the infeed conveyor to receive the conveyed object from the infeed conveyor.

14. The transfer system as claimed in claim 13 wherein the lifters are slats supporting the conveyed object and wherein the lifters include springs biasing the lifters to the lowered position.

15. The transfer system as claimed in claim 1 comprising an infeed conveyor below the track at the infeed transfer segment at which the carriers remove conveyed objects from the infeed conveyor.

16. The transfer system as claimed in claim 1 wherein the carriers support a conveyed object suspended such that the bottoms of the conveyed objects are below the carriers.

17. The transfer system as claimed in claim 1 wherein the conveyed object is a tray pack.

18. The transfer system as claimed in claim 1, wherein the carrier comprises:
    a plate having a top face as a support face for supporting a conveyed object and an opposite bottom side and one or more slots through the plate transverse to the conveying direction;
    one or more of the transfer members, wherein the one or more transfer members are movable along the one or more slots to push articles across the support face.

19. The transfer system as claimed in claim 18 comprising a linear-motor shuttle and wherein the carrier comprises fastening structure that extends from the bottom side of the plate and attaches to the linear-motor shuttle.

20. The transfer system as claimed in claim 1 wherein the transfer member includes suspended arms converging toward distal ends forming two support faces supporting the conveyed object with the bottom of the conveyed object suspended below the distal ends of the arms.

21. A transfer system comprising:
    a linear-motor conveyor including:
        a track having one or more infeed or outfeed transfer segments;
        a stator having drive coils arranged along the track;
        a plurality of shuttles driven by the stator along the track;
    a plurality of carriers, each mounted to one of the shuttles to support a conveyed object;
    a transfer member;
    wherein the transfer member transfers a conveyed object to an outfeed conveyor from one of the carriers at an outfeed transfer segment or from an infeed conveyor to the carriers at an infeed transfer segment;
    wherein each of the carriers is mounted to two consecutive shuttles on the track and wherein the two consecutive shuttles are driven toward and away from each other from a first spacing in which the two carriers hold the conveyed object to a greater second spacing in which the two carriers release the conveyed object at the outfeed transfer segment.

22. The transfer system as claimed in claim 21 wherein the carriers include a linkage and opposing arms operated by the linkage to grip the conveyed object when the shuttles are at the first spacing and that release the conveyed object when the shuttles are at the second spacing.

23. A carrier for a linear-motor conveyor comprising:
    a support face on which a conveyed object rests;
    fastening structure attachable to a linear-motor shuttle;
    a transfer member moving the conveyed object from the support face to an outfeed conveyor as the carrier advances in a conveying direction;
    a plurality of fixed slats spaced apart in the conveying direction by gaps, wherein the stationary slats have the support faces on top;
    a plurality of the transfer members disposed between the stationary slats and having top faces;
    wherein the plurality of the transfer members are movable from a lowered position in which the top faces of the transfer members are at or below the level of the support faces of the fixed slats to a raised position in which the top faces of the transfer members are above the level of the support faces of the fixed slats.

24. The carrier as claimed in claim 23 comprising a spring on each of the transfer members biasing the transfer member to the lowered position.

* * * * *